W. R. SMITH.
SPRING CONSTRUCTION.
APPLICATION FILED MAR. 1, 1909.
935,938.
Patented Oct. 5, 1909.
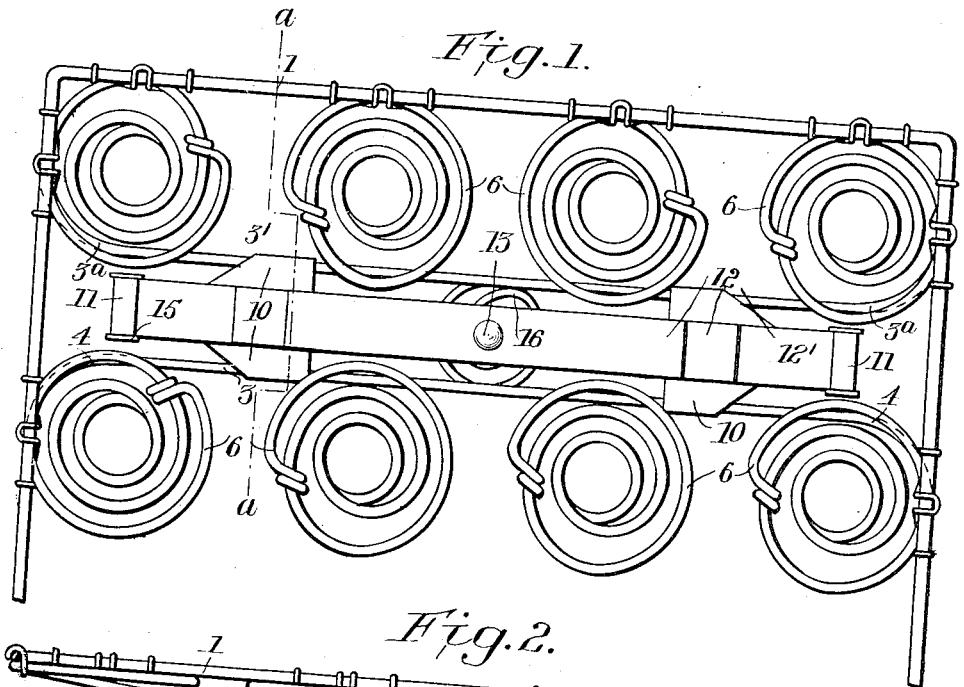
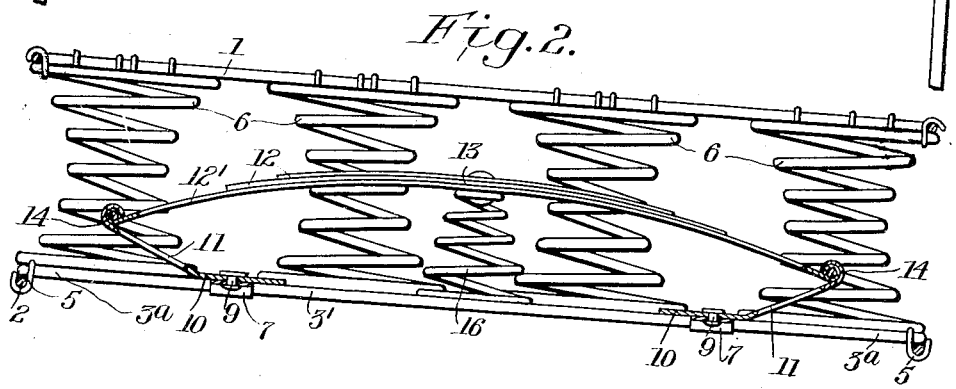
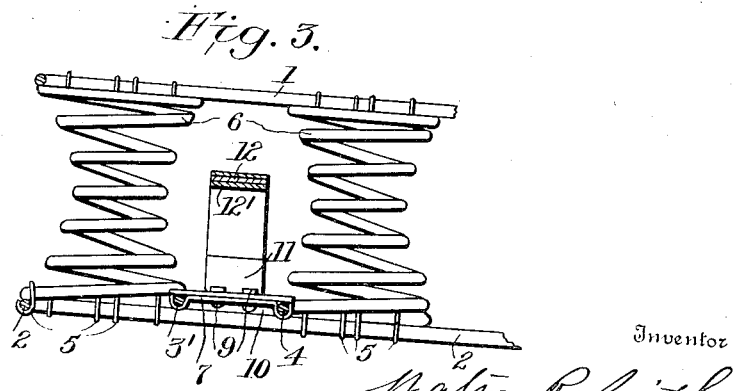

UNITED STATES PATENT OFFICE.

WATSON R. SMITH, OF JACKSON, MICHIGAN, ASSIGNOR TO JACKSON CUSHION SPRING CO., OF JACKSON, MICHIGAN.

SPRING CONSTRUCTION.

935,938.  Specification of Letters Patent.  Patented Oct. 5, 1909.

Application filed March 1, 1909.  Serial No. 480,762.

*To all whom it may concern:*

Be it known that I, WATSON R. SMITH, a citizen of the United States, residing at Jackson, in the county of Jackson and State of Michigan, have invented certain new and useful Improvements in Spring Constructions, of which the following is a specification.

This invention relates to spring constructions.

One object is to provide a spring construction for automobile or other seats embodying such characteristics that the rider of the structure will not be injured or inconvenienced by reason of contact with the support upon which the structure is mounted in the event that the seat should be unduly compressed or jarred incident to the weight of a heavy rider or by reason of the vehicle contacting with an obstruction in the roadway.

Another object is to reinforce the main springs of the structure with one or more arch springs adapted to be compressed only when the structure is subjected to unusual weight, whereby the auxiliary springs will catch the extra weight and prevent the structure from being wholly compressed, the arch springs being so mounted that when compressed, there will not be a noise or a spreading of the main frame of the structure.

With the above and other objects in view, the present invention consists in the combination and arrangement of parts hereinafter more fully described, illustrated in the accompanying drawings and particularly pointed out in the appended claims, it being understood that changes may be made in the form, proportion, size and minor details without departing from the spirit or sacrificing any of the advantages of the invention.

In the drawings, Figure 1 is a top plan view of my invention. Fig. 2 is a longitudinal sectional view through the auxiliary arch spring. Fig. 3 is a transverse sectional view on the line a—a of Fig. 1.

Referring now more particularly to the accompanying drawings, the reference characters 1 and 2 indicate upper and lower edge wires of the frame, which may be of rectangular or any other formation.

Disposed within the frame are pairs of spring supporting wires 3, the wires of each pair having their ends turned in opposite directions, as indicated at 4, and secured to the lower edge wire 2 by means of suitable clips 5. These supporting springs 3 are designed to support the main springs 6.

Connecting adjacent spring supporting wires 3 of each pair is a clip 7 which has grooves 8 to embrace said wires. Rigidly secured by means of rivets or any other suitable means 9 are feet 10 of the downwardly converging legs 11 of the auxiliary arch springs 12. The bodies of the auxiliary arch springs 12 are preferably of the leaf variety, as shown, with the leaves secured together at 13, the lowermost leaf 12' being turned about a pivot 14 and over this turned end of the lowermost leaf spring are turned the upper ends of the legs 11 of the auxiliary spring, there being washers 15 at the ends of said pivot pins 14 with the extremities of the pins upset to prevent displacement of the washers and to insure against displacement of the lowermost leaf of the auxiliary springs and their leg portions 11 from the pins 14. If desired, I may dispose a helical or other spring 16 beneath each auxiliary spring to cushion the same and aid the auxiliary spring in catching the extra weight. However, it will be understood that by reason of the peculiar formation of the auxiliary springs and especially by virtue of the pivotal connection between the bodies and legs thereof, that the auxiliary springs may be firmly supported and serve to catch the extra weight without the employment of the additional springs 16.

By virtue of the fact that the highest point of the main springs is below the plane of the highest convolutions of the main springs, and being entirely separate and distinct from the latter, the auxiliary springs are not compressed in the initial compression of the main springs, but only when the main springs have been compressed a certain degree or in the event of undue weight bearing upon the main springs.

The body of each auxiliary arch spring, while extending nearly across the structure, terminates short of the sides thereof. The result is that when the auxiliary springs are compressed subsequent to the initial compression of the main springs, the ends of the auxiliary springs cannot project beyond the sides of the structure or in any way cause a truss action between the auxiliary springs and the frame. Moreover, the structure is practically, if not completely noiseless in operation.

The end supporting wires 3' have their opposite ends 3ª directed toward the corresponding ends of the lower edge wire and terminate short thereof, their particular supporting wires being held in position by means of clips in the same manner that the remaining supporting wires are held in place and being adapted particularly to coöperate with the ends of the lower edge wires for the support of the end rows of main springs.

What is claimed is:—

1. In means for reinforcing spring constructions, a frame, supporting wires, an arch spring secured to said supporting wires and including a body and downwardly converging leg portions hingedly connected to the body, and means for cushioning the arch spring.

2. In means for reinforcing spring constructions, a frame, supporting wires, arch springs secured to said supporting wires, each including a body and downwardly converging leg portions hingedly connected to the body, and a spring beneath each arch spring to cushion the latter.

3. In means for reinforcing spring constructions, a frame, supporting wires, an arch spring in the frame including a body, downwardly converging leg portions hingedly connected to the body, feet portions directed toward each other over the supporting wires, and means to clamp the supporting wires and feet portions together.

4. In means for reinforcing spring constructions, a frame, supporting wires, an arch spring in the frame including a body, downwardly converging leg portions hingedly connected to the body, feet portions directed toward each other over the supporting wires, means to clamp the supporting wires and feet portions together, and means beneath the arch spring to cushion it.

5. An auxiliary spring for use in spring constructions, which spring constructions have frames and main springs mounted within the frames, said auxiliary spring consisting of a body portion and converging leg portions hingedly connected to the body portion, and means for supporting the extremities of the leg portions within the frame.

In testimony whereof I affix my signature, in presence of two witnesses.

WATSON R. SMITH.

Witnesses:
ETHEL M. PHELAN,
ERNEST D. McCUEN.